UNITED STATES PATENT OFFICE 2,038,364

INDIGOID DYESTUFFS AND PROCESS OF MAKING SAME

Eduard Kambli and Jaroslaw Fröhlich, Basel, and Ernst Stöcklin, Binningen, near Basel, Switzerland, assignors to the firm Society of Chemical Industry in Basle, Basel, Switzerland No Drawing. Application April 15, 1935, Serial No. 16,510. In Switzerland April 21, 1934

4 Claims. (Cl. 260—49)

This invention relates to the manufacture of indigoid dyestuffs by condensing a reactive α-derivative of the 4:7-dialkylisatins of the general formula

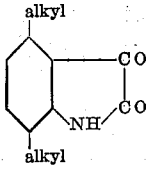

which may be substituted in the para-position to the imino-group by halogen, with a hydroxy-compound capable of coupling, in which the carbon atom tending to couple belongs to a six-membered ring. If desired, the dyestuffs thus obtained may be treated with a halogenating agent.

Reactive α-derivatives of these isatins are for example 4:7-dimethylisatin-α-chloride, 4:7-dimethylisatin-α-anilide, 4:7-dimethyl-5-chlorisatin-α-chloride, 4:7-dimethyl-5-chlorisatin-α-anilide, 4:7-dimethyl-5-bromisatin-α-chloride, 4:7-dimethyl-5-bromisatin-α-anilide.

Hydroxy-compounds capable of coupling in which the carbon atom tending to couple belongs to a six-membered ring, which hydroxy-compounds are to be condensed in accordance with this invention with the aforesaid reactive isatin-α-derivatives are, for example, the following compounds capable of coupling: phenols, hydroxynaphthalenes, hydroxyanthracenes, hydroxycarbazoles, hydroxyanthrones, hydroxyacenaphthenes, as well as their halogenated, alkylated, alkoxylated, acylaminated substitution products, for instance 4-chloro-1-phenol, 4-alkoxy-1-phenol, 4-chloro- or 4-bromo-1-hydroxynaphthalene, 4-acetylamino- or 4-benzoylamino-1-hydroxynaphthalene, 4-acetyl- or 4-benzoyl-1-hydroxynaphthalene, 4-methoxy- or 4-ethoxy-1-hydroxynaphthalene, 4-chloro- or 4-bromo-1-hydroxyanthracene, 2:4-dihydroxyquinoline and hydroxycarbazoles of the benzene and naphthalene series.

The reactive α-derivative can be condensed with the hydroxy-compound in aqueous medium or in presence of an organic solvent, for instance alcohol, glacial acetic acid, benzene, acetic anhydride, dyestuffs being thereby obtained of the general formula

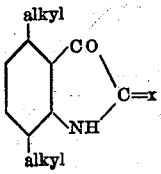

in which $x$ represents the radical of a hydroxy-compound capable of coupling, whose carbon atom capable of coupling belongs to a six-membered ring system, and in which the para-position to the imino-group may be substituted by halogen.

By treating the dyestuff obtained with a halogenating agent, such as chlorine, bromine or sulfuryl chloride in sulfuric acid or nitrobenzene solution, for example, the fastness of the dyestuffs can be enhanced. Further, the dyestuffs may be converted into leuco-ester salts by the usual methods.

Dyestuffs obtainable by the invention are suitable for dyeing and printing various materials, for instance vegetable and animal fibres, such as cotton, wool, and artificial silk from regenerated cellulose; the dyeings and printing obtained are of very various tints and very fast.

Of particular value are the dyestuffs obtainable by this invention of the general formula

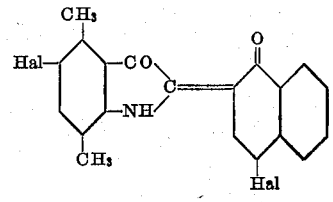

wherein the naphthalene residue may contain still further substituents; these dyestuffs dye blue, very fast tints, for instance tints fast to chlorine and light and of good night-colours.

The following examples illustrate the invention, the parts being by weight:—

Example 1

17.5 parts of 4:7-dimethylisatin are converted into the 4:7-dimethylisatin-α-chloride by heating them with 22 parts of phosphorus pentachloride and 300 parts of benzene and the 4:7-dimethylisatin-α-chloride is mixed with a solution, at 45–50° C., of 18 parts of 4-chloro-1-hydroxynaphthalene in 400 parts of benzene. The dyestuff of the formula

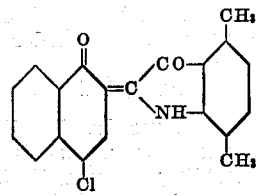

separates in the form of a dark blue, crystalline powder and is filtered, washed with benzene and dried. It dissolves in concentrated sulfuric acid to a green solution and dyes cotton in a yellow-green vat blue tints.

When this dyestuff is dissolved in concentrated sulfuric acid and the solution is mixed with about 1½ to 2 mol. bromine, there is obtained, after stirring at 20–30° C. for several hours, a dyestuff which also dyes blue tints.

Example 2

25.4 parts of 5-bromo-4:7-dimethylisatin are converted into 5-bromo-4:7-dimethylisatin-α-chloride by treatment with 300 parts of chlorobenzene and 22 parts of phosphorus penta-chloride; the 5-bromo-4:7-dimethylisatin-α-chloride is mixed with a solution at 45–50° C. of 14.5 parts of 1-hydroxynaphthalene in 400 parts of chlorobenzene. The dyestuff of the formula

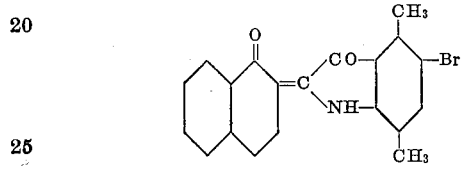

separates in the form of a dark blue, crystalline powder; it is filtered when cold and freed from chlorobenzene by washing with alcohol. It dissolves in concentrated sulfuric acid to a green solution and dyes cotton in a yellow-green vat blue tints. By halogenation with bromine or sulfuryl chloride in chlorobenzene the properties of the dyestuff are essentially improved.

If the 1-hydroxynaphthalene used in the example is exchanged for the corresponding quantity of 1-hydroxyanthracene there is obtained a dyestuff which dyes more greenish tints.

Example 3

17.5 parts of 4:7-dimethylisatin are converted into the 4:7-dimethylisatin-α-chloride by heating them for 1 hour with 22 parts of phosphorus pentachloride and 400 parts of chlorobenzene at 95–100° C. The solution thus obtained is cooled to 60° C. and 14 parts of sulfuryl chloride are added; the mixture is stirred for 1 hour at 60–65° C. and then added to a solution at 45–50° C. of 18 parts of 4-chloro-1-hydroxynaphthalene in 500 parts of chlorobenzene. The dyestuff of the formula

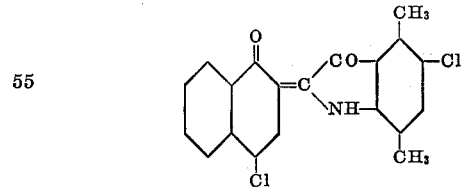

separates in the form of a blue crystalline powder which is filtered when cold and washed with chlorobenzene and with alcohol. It dissolves to a green solution in concentrated sulfuric acid and dyes cotton in a yellow-green vat very fast blue tints. The dyestuff agrees in its properties with the condensation product from 5-chloro-4:7-dimethylisatin-α-chloride and 4-chloro-1-hydroxynaphthalene.

Example 4

25.4 parts of 5-bromo-4:7-dimethylisatin are converted into the 5-bromo-4:7-dimethylisatin-α-chloride by heating them with 300 parts of chlorobenzene and 22 parts of phosphorus pentachloride; the mass is mixed with a solution, at 45–50° C. of 22.3 parts of 4-bromo-1-hydroxynaphthalene in 500 parts of chlorobenzene. The dyestuff of the formula

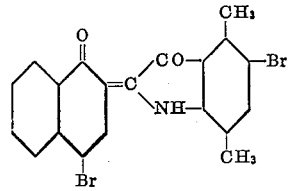

separates in the form of a dark blue, crystalline powder and is purified by filtration and washing with chlorobenzene and with alcohol; it dissolves in concentrated sulfuric acid to a green solution and dyes cotton in a yellow-green vat very fast blue tints. When this dyestuff is used for printing cotton there are obtained blue prints, fast to chlorine and to light, and of good night colour.

The same dyestuff is obtained when 5-bromo-4:7-dimethylisatin-α-chloride is exchanged for the corresponding α-anilide.

Example 5

Into a solution of 18 parts of 4-chloro-1-hydroxynaphthalene in 500 parts of chlorobenzene, at 45–50° C. there is allowed to flow a solution of 5-bromo-4:7-dimethylisatin-α-chloride obtained by heating 25.4 parts of 5-bromo-4:7-dimethylisatin with 22 parts of phosphorus pentachloride and 400 parts of chlorobenzene. The dyestuff of the formula

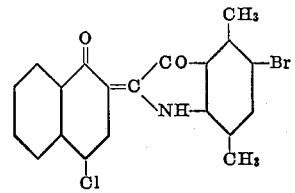

separates after cooling in the form of a dark blue, crystalline powder which is filtered and washed with chlorobenzene and with alcohol. It dissolves in concentrated sulfuric acid to a green solution and dyes cotton in a yellow-green vat very fast blue tints. When this dyestuff is printed on cotton there are obtained blue prints which are fast to chlorine and light and of good night colour.

What we claim is:—

1. Indigoid dyestuffs of the general formula

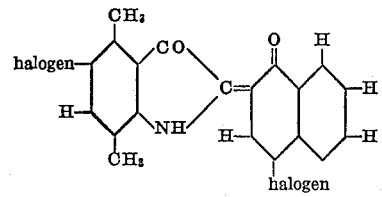

which products are blue to dark blue crystalline powders, dissolving in concentrated sulfuric acid to green solutions and dyeing cotton from a yellow-green vat blue tints of very good fastness to chlorine and light.

2. The indigoid dyestuff of the formula

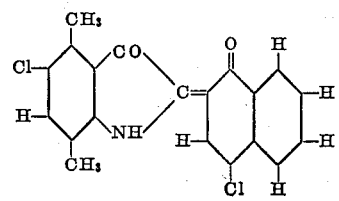

which product is a blue crystalline powder dissolving in concentrated sulfuric acid to a green solution, and dyeing cotton from a yellow-green vat blue tints of very good fastness to chlorine and light, and which is particularly suitable for printing cotton.

3. The indigoid dyestuff of the formula

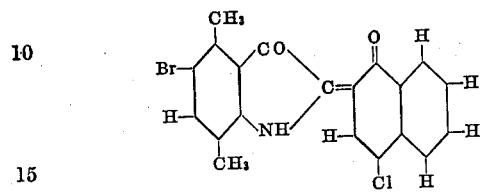

which product is a dark blue crystalline powder dissolving in concentrated sulfuric acid to a green solution, and dyeing cotton from a yellow-green vat blue tints of very good fastness to chlorine and light, and which is particularly suitable for printing cotton.

4. The indigoid dyestuff of the formula

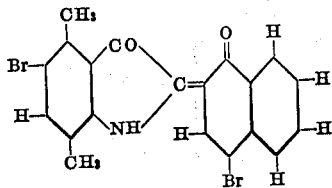

which product is a dark blue crystalline powder dissolving in concentrated sulfuric acid to a green solution, and dyeing cotton from a yellow-green vat blue tints of very good fastness to chlorine and light, and which is particularly suitable for printing cotton.

EDUARD KAMBLI.
JAROSLAW FRÖHLICH.
ERNST STÖCKLIN.